Jan. 17, 1961
D. J. CHLECK ET AL
2,968,722
GAS MONITORING TECHNIQUES
Filed May 6, 1957
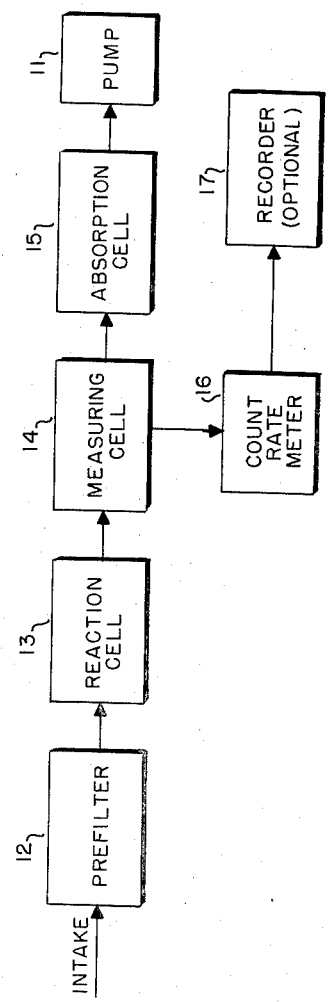
INVENTORS
DAVID J. CHLECK
CHARLES A. ZIEGLER
BY
ATTORNEY

United States Patent Office 2,968,722
Patented Jan. 17, 1961

2,968,722

GAS MONITORING TECHNIQUES

David J. Chleck, West Newton, and Charles A. Ziegler, Saxonville, Mass., assignors to Tracerlab, Inc., Waltham, Mass., a corporation of Massachusetts Filed May 6, 1957, Ser. No. 657,152

9 Claims. (Cl. 250—43.5)

The present invention relates in general to the detection of a predetermined gaseous substance in a medium and more particularly concerns a reliable, economical technique for the detection of trace amounts of sulfur dioxide in air.

Sulfur dioxide, a product of many industrial operations and domestic activities has for years been recognized as one of the more serious air pollutants. It has probably been subject to more measurement than any other single pollutant. Among the industrial operations that require surfur dioxide monitoring and control are steam plants, coke and coal extraction processes, oil refineries, natural gas facilities, the paper and pulp industry, agricultural chemicals and a host of others.

Several types of instruments are available for monitoring sulfur dioxide, but these are both expensive and complicated in operation. Among these is the Davis conductivity analyzer which utilizes a conductivity measurement in distilled water. It is absolutely unspecific and any ionizable gas entering this instrument seriously interferes with its operation so as to render it useless as a field monitoring instrument. The wide range of materials capable of effecting the operation of this device makes it impossible to preferentially measure sulfur dioxide by any simple means, such as prefiltration of the intake.

Another device which basically uses a conductivity measurement is the Thomas Autometer. This instrument utilizes a sulfuric acid-hydrogen peroxide solution to oxidize sulfur dioxide to a sulfate ion which is then measured. This device is also non-specific for the same reason as the instrument previously described, i.e., reliance on a conductivity measurement. Both of these instruments are bulky, complicated and delicate due to the fact that they rely on a continuous solution flow technique. In addition, these instruments are temperature sensitive and must depend on rather complex temperature compensating mechanisms for satisfactory operation.

Still another commonly used instrument is the Titrilog which depends on the generation of bromine to brominate impurities which are brought in through a reaction cell. The quantity of bromine generated is proportional to the amount of impurity and serves as the method of measurement (being the quantity titrated against the impurity). Any material which can be brominated will seriously interfere with its operation as a detector for sulfur dioxide. This instrument, though small in size, is extremely complicated both mechanically and electronically. Since this device, in common with the two instruments previously described, incorporates a liquid reaction cell, it is not a rugged instrument. Moreover, this and the other instruments described above are expensive.

The present invention contemplates and has as a primary objective the provision of a simple, low-cost instrument capable of instantaneously and quantitatively indicating the presence of even trace amounts of a foreign gas, such as sulfur dioxide, in air, suitable both for field studies of air pollution and for process control. Basically, the method of the invention consists in the conversion of the gas sought to be detected into a radioactive substance, and sensing the radioactivity of the latter substance. In a specific aspect of the invention involving the detection of sulfur dioxide, this is accomplished by utilizing a reaction which substitutes radioactive chlorine dioxide for the incoming sulfur dioxide in accordance with the following equation:

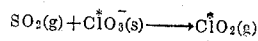

This reaction is especially advantageous for detecting minute quantities of sulfur dioxide since its efficiency is of the order of 97 percent.

The method of detection relies on the measurement of the amount of radioactivity in the effluent air. $Cl^{36}$ produces a $\beta$ particle which has an $E_{max}$ of about 700 kilovolts. This can be detected readily by conventional radiation counting methods. Moreover, the extremely long half-life of $Cl^{36}$ (about $4 \times 10^5$ years) makes the useful shelf-life of the reaction cell practically the same as the instrument itself.

An object of the invention is the provision of apparatus for accurately detecting the presence of minute quantities of sulfur dioxide in air.

A further object of the invention is the provision of apparatus which continuously indicates the contemporary value of the amount of sulfur dioxide in the air under test.

These objects and other features and advantages of the present invention will become apparent from the following specification when read in connection with the accompanying drawing, the single figure of which illustrates a block diagram of a specific embodiment of the apparatus.

With reference now to the drawing, a pump 11 maintains a continuous flow of gas through serially connected prefilter 12, reaction cell 13, measuring cell 14 and absorption cell 15. Air, which may contain a quantity of sulfur dioxide, enters prefilter 12 which removes gases which may affect the process in an undesirable manner, but selectively passes substantially all the sulfur dioxide to reaction cell 13. Typically powdered zinc may be used as a prefilter to eliminate hydrochloric acid. In reaction cell 13, there is a radioactive chlorate $(Cl^*O_3^-)$ which may be a solid; as for example, an alkaline or alkaline earth chlorate. The chlorate includes radioactive chlorine, such as $Cl^{36}$ which reacts with sulfur dioxide to produce a radioactive test gas, chlorine dioxide. The quantity of chlorine dioxide produced is directly related to the amount of sulfur dioxide entering the reaction cell, there being sufficient chlorate to enable all the sulfur dioxide incident to the reaction cell to participate in reaction. The released radioactive test gas continues through measuring cell 14. The radioactivity in measuring cell 14 is sensed by count rate meter 16, the count rate being proportional to the amount of radioactive gas produced, and consequently, proportional to the amount of sulfur dioxide in the air under test. The output of measuring cell 14 flows into an absorption cell 15 so that no radioactive material ever leaves the instrument. If desired, a recorder 17 may continuously record the instantaneous count rate indicated by count rate meter 16. The output of count rate meter 16 may also be used to trip an alarm when the sulfur dioxide quantity in the air exceeds a predetermined value, or it may be used to control a process for altering the amount of sulfur dioxide emitted into the air. The activity rate may be calibrated to indicate quantitatively the amount of sulfur dioxide present.

Although, as indicated above, the process can be affected by gases other than sulfur dioxide (particularly strong acids such as HCl), these materials can be readily absorbed, preferentially before the air stream reaches the reaction cell. Thus, unlike the prior art instruments described above, this system can be made specific for sulfur dioxide since there is only a narrow range of materials capable of affecting its operation.

An additional advantage of using chlorate compounds which include the radioactive element $Cl^{36}$ is that $Cl^{36}$ is a pure $\beta$ emitter. Hence, the instrument is safe to use and practically no radiation shielding is required. The absence of radiation shielding reduces the cost and weight of this instrument. While the instrument described herein is especially advantageous when used as a direct air monitor for sulfur dioxide, the principles of the invention are equally applicable to the detection of other substances. For example, the specific embodiment described herein may be utilized to analyze other sulfur-containing materials by oxidizing them prior to their entrance into the apparatus. It is thus possible to measure not only sulfur dioxide, but also obtain its ratio with that of other sulfur-containing material.

Numerous departures from and modifications of the specific apparatus described herein may now be practiced by those skilled in the art without departing from the inventive concepts. Consequently, the invention is to be construed as limited only by the spirit and scope of the appended claims.

What is claimed is:

1. A method of testing for the presence of sulfur dioxide in a gaseous medium which comprises the steps of passing said gaseous medium over a chlorate compounded with radioactive chlorine thereby deriving a test gas, and sensing the radioactivity of said test gas.

2. A method of testing for the presence of sulfur dioxide in a gaseous medium which comprises the steps of passing said gaseous medium over a chlorate compounded with radioactive chlorine thereby deriving a test gas containing radioactive chlorine dioxide when said medium contains sulfur dioxide, and sensing the radioactivity of said test gas.

3. A method of testing for the presence of sulfur dioxide in a gaseous medium which comprises the steps of prefiltering said gaseous medium for the selective absorption of gaseous components other than sulfur dioxide, passing said prefiltered gaseous medium over a chlorate compounded with radioactive chlorine thereby deriving a test gas which contains radioactive chlorine dioxide when said gaseous medium contains sulfur dioxide, and sensing the radioactivity of said test gas, said selective absorption removing gases other than sulfur dioxide from said gaseous medium capable of otherwise yielding a radioactive component in said test gas.

4. Apparatus for detecting the presence in a gaseous medium of a predetermined gaseous component capable of evolving a radioactive gaseous effluent in a reaction cell from a substance containing a radioactive element comprising, means for establishing contact between said gaseous medium and said substance to produce a test gas which includes said radioactive element when said gaseous component is present in said medium, means for channeling said test gas into a measuring cell, and indicating means responsive to the presence of radioactivity in said measuring cell.

5. Apparatus for detecting the presence in a gaseous medium of a predetermined gaseous component capable of evolving a radioactive gaseous effluent in a reaction cell from a substance containing a radioactive element comprising, a prefilter arranged to accept said gaseous medium and selectively absorb gaseous substances other than said predetermined gaseous component capable of reacting with said radioactive substance to produce a radioactive gaseous effluent, said reaction cell being arranged to accept the output of said prefilter and provide radioactive test gas output only when said predetermined gaseous component is present in the output of said prefilter, a measuring cell for accepting said test gas output from said reaction cell, and radioactivity sensing means responsive to the presence of said radioactive test gas in said measuring cell.

6. Apparatus for detecting the presence in a gaseous medium of a predetermined gaseous component capable of evolving a radioactive gaseous effluent in a reaction cell from a substance containing a radioactive element comprising, means for filtering said gaseous medium for selectively absorbing gases other than said predetermined gaseous component capable of reacting with said radioactive substance to produce a radioactive gaseous effluent, means for applying said filtered gaseous medium to said reaction cell to provide a test gas which is radioactive only when the filtered gaseous medium includes said predetermined gaseous component, a measuring cell for accepting said test gas, indicating means responsive to radioactivity in said test gas evolved in said measuring cell, and an absorption cell arranged to absorb the radioactive test gas which emerges from said measuring cell.

7. Gas detection apparatus as in claim 5 wherein said filtering means is arranged to selectively preclude passage to said reaction cell of gaseous components other than sulfur dioxide capable of forming radioactive gases for application to said test cell.

8. Apparatus for indicating the presence of sulfur dioxide as a component of a gaseous medium comprising, a reaction cell including a chlorate compounded with radioactive $Cl^{36}$, means for filtering said gaseous medium to selectively absorb all gases components other than sulfur dioxide capable of reacting with said chlorate and generating gases containing radioactive chlorine, means for applying said filtered gaseous medium to said reaction cell to yield a test gas which contains radioactive chlorine dioxide in proportion to the sulfur dioxide present in said gaseous medium, a measurnig cell including radioactivity sensing means, and means for channeling said test gas into said measuring cell, whereby said sensing means provides an output indicative of the sulfur dioxide content of said gaseous medium.

9. A method of detecting the presence within a medium of a predetermined non-radioactive compound capable of evolving a radioactive effluent from a reactive material containing a radioactive element comprising the steps of exposing said medium to said reactive material to provide a test substance which includes said radioactive element in an effluent only when said predetermined compound is present in said medium, and sensing the radioactivity of said test substance.

References Cited in the file of this patent

UNITED STATES PATENTS

| | | |
|---|---|---|
| 2,367,949 | Langer | Jan. 23, 1945 |
| 2,487,797 | Friedman et al. | Nov. 15, 1949 |
| 2,547,874 | Klema | Apr. 3, 1951 |
| 2,599,922 | Kanne | June 10, 1952 |
| 2,691,109 | Bernard | Oct. 5, 1954 |
| 2,702,898 | Meili | Feb. 22, 1955 |
| 2,740,894 | Deisler et al. | Apr. 3, 1956 |
| 2,744,199 | Juterbock et al. | May 1, 1956 |
| 2,813,010 | Hutchins | Nov. 12, 1957 |

FOREIGN PATENTS

| | | |
|---|---|---|
| 398,722 | Great Britain | Sept. 21, 1933 |